United States Patent
Goldman et al.

(10) Patent No.: US 6,977,946 B1
(45) Date of Patent: Dec. 20, 2005

(54) VIRTUAL CONNECTION SERVICE CACHE FOR FILLING AVAILABLE BANDWIDTH

(75) Inventors: Gary Goldman, Los Altos, CA (US); David Hughes, Palo Alto, CA (US); Madhav Marathe, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 703 days.

(21) Appl. No.: 09/749,089

(22) Filed: Mar. 12, 2001

(51) Int. Cl.$^7$ .............................................. H04J 3/16
(52) U.S. Cl. .................. 370/468; 370/395.41; 370/412
(58) Field of Search ................. 370/229, 230, 370/231, 397, 399, 395.3, 395.31, 395.32, 370/395.4, 401, 412, 417, 442, 391, 468, 370/395.41

(56) References Cited

U.S. PATENT DOCUMENTS 5,712,851 A * 1/1998 Nguyen et al. ............. 370/399
5,734,650 A * 3/1998 Hayter et al. ............... 370/391

* cited by examiner

Primary Examiner—Phirin Sam
Assistant Examiner—Robert W. Wilson
(74) Attorney, Agent, or Firm—Blakely, Sokoloff, Taylor & Zafman LLP

(57) ABSTRACT

A method to utilize unscheduled bandwidth in a calendar-based VC scheduling scheme by caching a plurality of virtual connections for processing. A plurality of virtual connection addresses are stored in a cache memory. A virtual connection corresponding to one of these addresses is processed if one of the time periods for transmitting on the trunk is liable to be wasted because no cell is available through the normal calendaring algorithm. A VC cache is added to the VC scheduler in "parallel" with the calendar-based scheduler. When the calendar-based scheduler has a time period in which no VC is scheduled for transmission on the trunk, a VC address is obtained from the cache and that VC is processed. What makes this scheme work is the observation that the VCs that have been active will have more cells to transmit.

16 Claims, 6 Drawing Sheets

VIRTUAL CONNECTION SERVICE CACHE FOR FILLING AVAILABLE BANDWIDTH

FIELD OF THE INVENTION

The present invention relates generally to telecommunication systems, and, more particularly, to a system and method for more efficiently using available bandwidth in a connection-oriented network, such as an Asynchronous Transfer Mode (ATM) network.

BACKGROUND OF THE INVENTION

ATM is a switching and multiplexing technique designed for transmitting digital information, such as data, video, and voice, at high speed, with low delay, over a telecommunications network. In ATM networks connections or "calls" must be established between one information device such as a computer system or router and another. This call or connection is sometimes referred to as a "virtual connection" (VC) particularly where a specified data pipe is artificially, through software, segmented into separate datapathways, each pathway servicing a particular VC. The ATM network includes a number of switching nodes coupled through communication links. Often a switch acts as an intermediary to direct one or more of these VCs through a particular network node. FIG. 1 is a block diagram of a portion of such a telecommunications network. The network 100, shown in FIG. 1 includes a switch 105. The switch contains lines cards 110 that typically have thousands of VCs that transmit user data, though at a given time only a small fraction of the VCs may be transmitting data. The incoming lines for the user data typically may be T1 lines with a capacity of 1.54 mbps. The switch also contains trunk cards 115 connected to outgoing trunk lines that typically may be OC3 lines with a capacity of 155 mbps. A number of incoming lines will go out of one trunk card (e.g, trunk card 120). The data is then directed to various nodes in the network 125a–125e.

A calendaring scheme is typically used to determine which of the hundreds or thousands of active VCs will have access to the available bandwidth and be able to transmit data. The scheme depends on such factors as the number of active VCs, the bandwidth a particular VC requires, and the quality of service a particular user is entitled to. FIG. 2 depicts a simplified calendaring scheme for five VCs A through E. Typically each calendar time slot may have several VCs to be processed at that time. Each VC has a rate at which it is supposed to send data. The calendaring scheme shown in FIG. 2 includes a calendar 205 showing the calendaring of VCs A through E. As shown, VC A will be processed at time equal to looms. This means that ASIC hardware will put a cell from VC A in the ready queue 210 where it will be transmitted in approximately a millisecond. In practice several cells from several VCs are queued at each time slot as noted above. At time equal to 100 ms, a cell from VC $A_1$ is in trunk queue 215, while cells from VCs $A_2$–$A_3$ are in ready queue 210. The data in the ready queue 210 is forwarded to the trunk queue 215, which may be only one cell deep, and is then transmitted over the trunk. Depending on current usage and memory use as well as quality of service, VC A (i.e., VCs processed at time equals 100 ms) will then be placed down the calendar for future processing. This placement is determined in parallel with the processing and is typically accomplished within nanoseconds. In the example shown in FIG. 2, VC A is scheduled for processing every 700 ms. This means that VC A will not be processed again until time equals 800 ms. VCs B through E are scheduled similarly. New VCs are placed in the calendar scheme when they become active. Once they are opened they are placed in the calendaring scheme at a certain time and then get processed at a promised frequency. This calendaring is done dynamically through use of an algorithm implemented by the ASIC hardware. The calendaring is typically accomplished within one clock cycle, which doesn't leave time for sorting or calculating. There is no ability or desire to fill every time period. The algorithm places the VCs to ensure fairness. The result is that there are sporadic empty time periods in which no data is being forwarded to the trunk queue for transmission. As shown in FIG. 2, calendar 205 does not have a VC scheduled for time periods 600 ms, 700 ms, 900 ms, 1200 ms, 1400 ms, 1600 ms, or 1800 ms. The system takes just as long to process an empty time period and therefore this time is wasted.

SUMMARY OF THE INVENTION

A method is provided for caching a plurality of virtual connections for processing. A plurality of virtual connection addresses are stored in a cache memory. A virtual connection corresponding to one of these addresses is processed if one of the time periods for transmitting on the trunk is liable to be wasted because no cell is available through the normal calendaring algorithm.

Other features and advantages of the present invention will be apparent form the accompanying drawings, and from the detailed description, which follows below.

BRIEF DESCRIPTION OF THE DRAWINGS

The present invention is illustrated by way of example and not limited by the figures of the accompanying drawings in which like references indicate similar elements and in which.

DETAILED DESCRIPTION

A system and method are described that use unscheduled bandwidth in a calendar-based VC scheduling scheme. A VC cache is added to the VC scheduler in "parallel" with the calendar-based scheduler. When the calendar-based scheduler has a time period in which no VC is scheduled for transmission on the trunk, a VC address is obtained from the cache and that VC is processed. An intended advantage of embodiments of the present invention is to provide greater trunk utilization and efficiency in the use of a calendar-based VC scheduler. Another intended advantage is to implement a parallel cache-based VC scheduling scheme without interfering with the calendar-based VC scheduler or other parallel schedulers. Another intended advantage is to determine which VC addresses may be added to the cache. What makes this scheme work is the observation that the VCs that have been active will have more cells to transmit.

Figure 1:
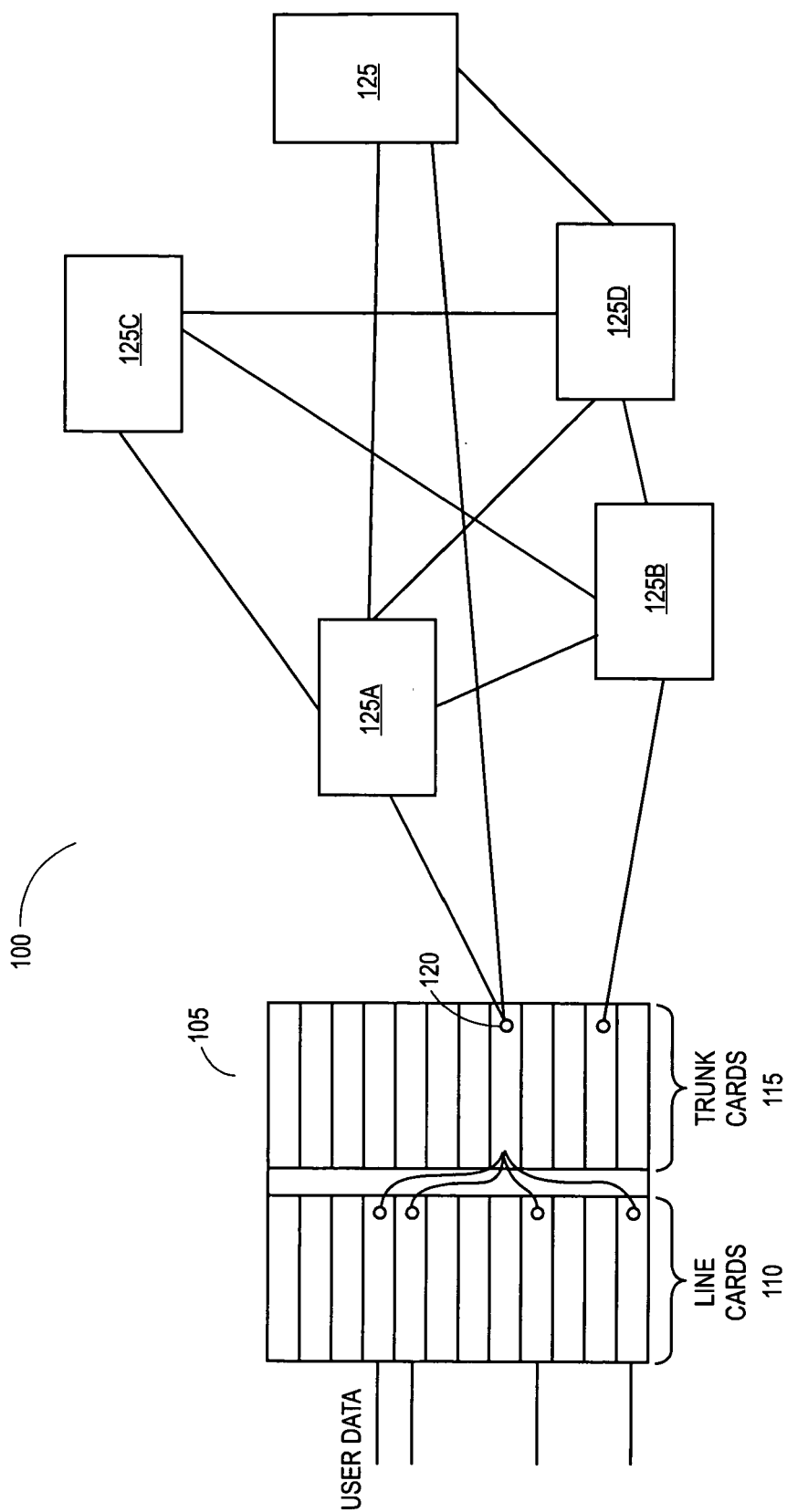
FIG. 1 is a block diagram of a portion of such a telecommunications network in accordance with the present invention.
Figure 2:
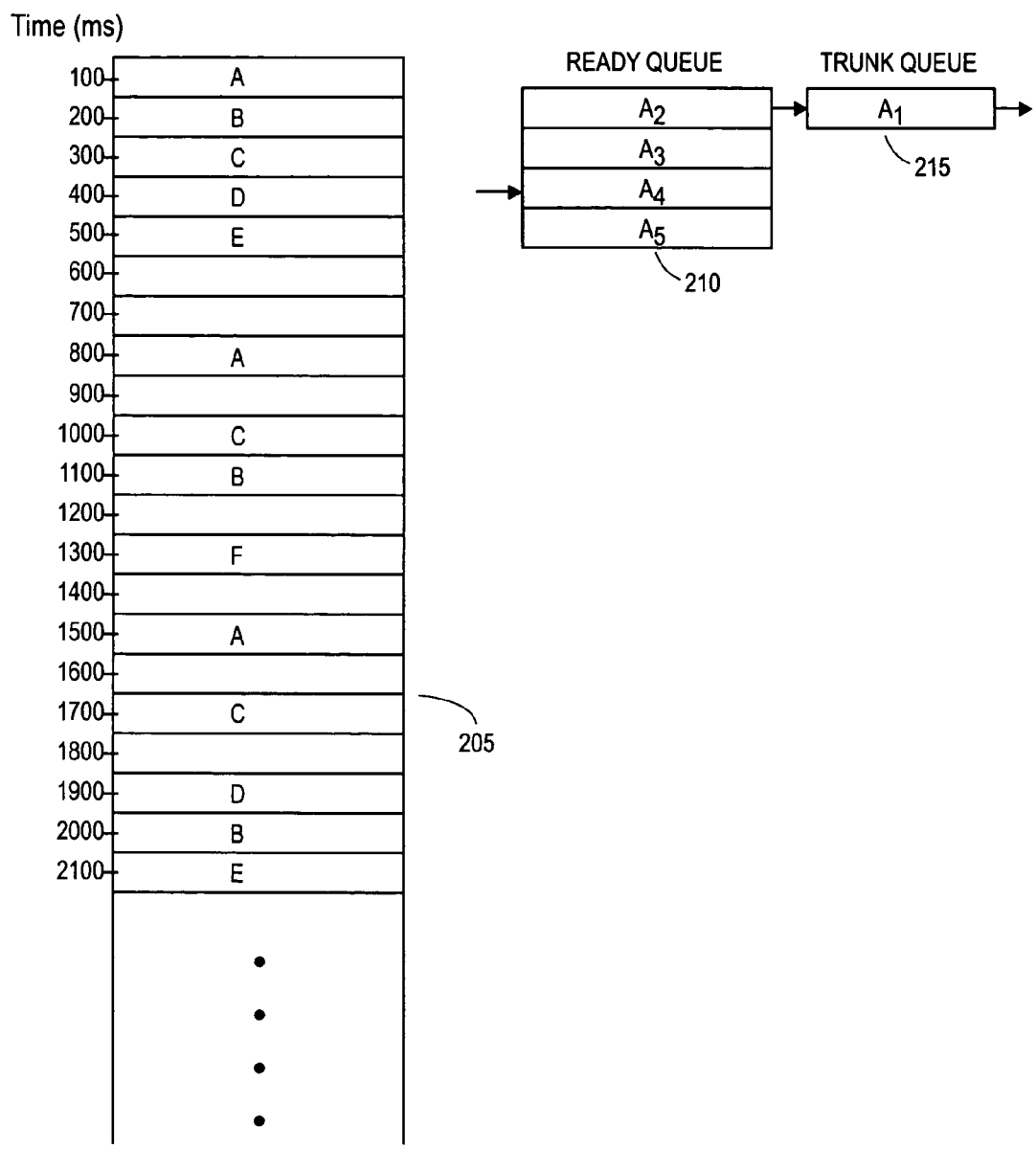
FIG. 2 depicts a simplified prior art calendaring scheme.
Figure 3:
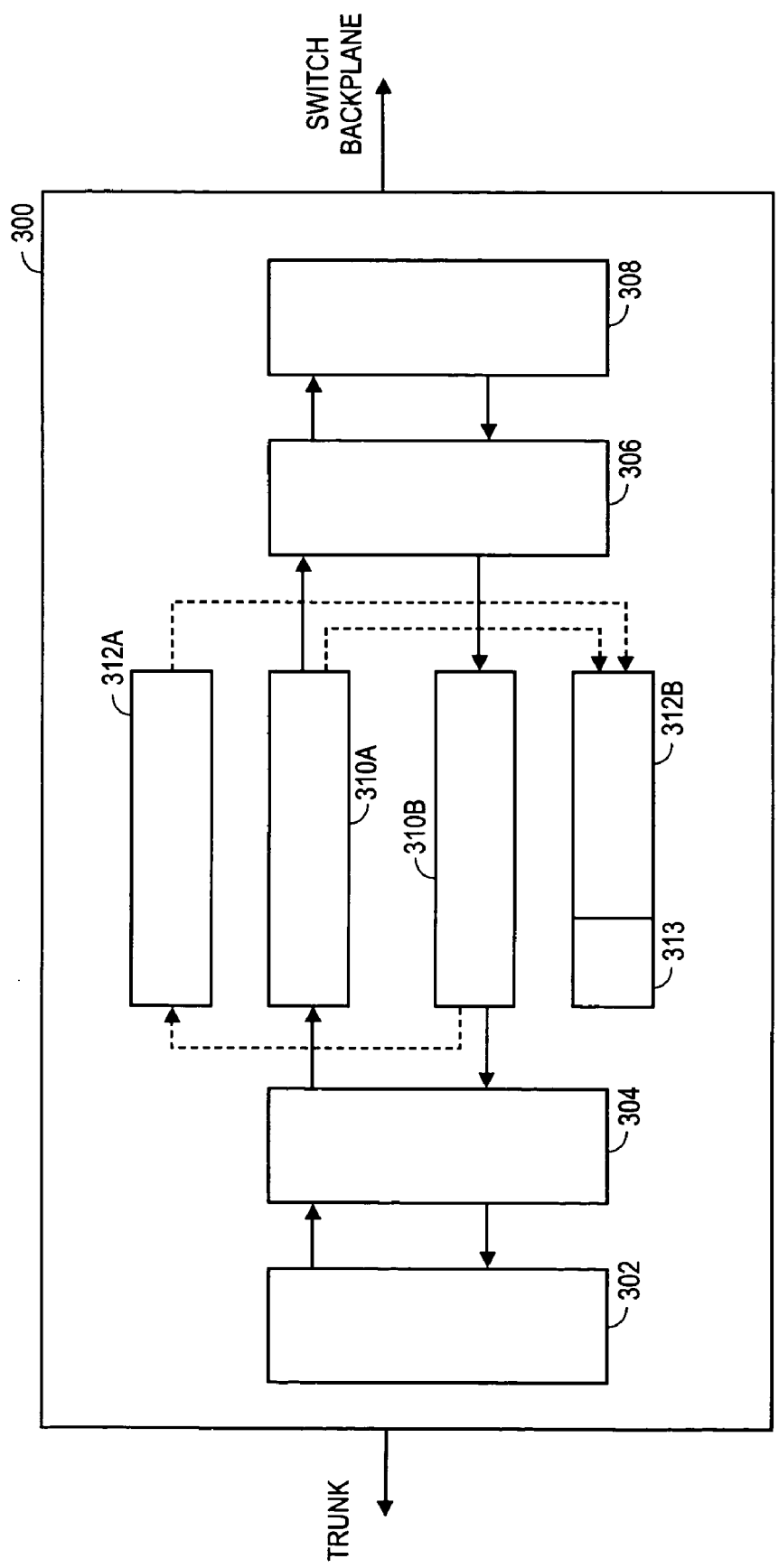
FIG. 3 depicts a line card having a VC service cache in accordance with one embodiment of the present invention.

FIG. 3 is a block diagram of a line card according to one embodiment of the present invention. The line card 300 shown in FIG. 3 contains a number of ASICs that perform the various functions of the line card. ASIC 302 extracts and inserts ATM cells. ASIC 304 performs the functions of connection identification and flow management, among others, for data ingress. ASIC 306 performs similar functions for data egress. ASIC 308 connects the switching fabric through the switch backplane. ASICs 310A and 310B control the cell memory buffer space for ingress (310A) and egress (310B) as well as the VC queues. ASICs 312A (ingress) and 312B (egress) are responsible for congestion management and cell output scheduling. ASIC 312 B contains VC service cache 313 in accordance with one embodiment of the present invention. ASIC 310B (egress) interfaces primarily with ASIC 312A (ingress), and ASIC 310A (ingress) interfaces primarily with ASIC 312B (egress). The pairs provide the queuing, buffer management, and bandwidth management functions of line card 300.

In one embodiment the cache-based VC scheduling scheme is implemented on an ASIC as described above. In an alternative embodiment the cache-based VC scheduling scheme may be implemented by a general-purpose computer processor using computer software containing executable instructions on machine-readable medium.

Figure 4A:
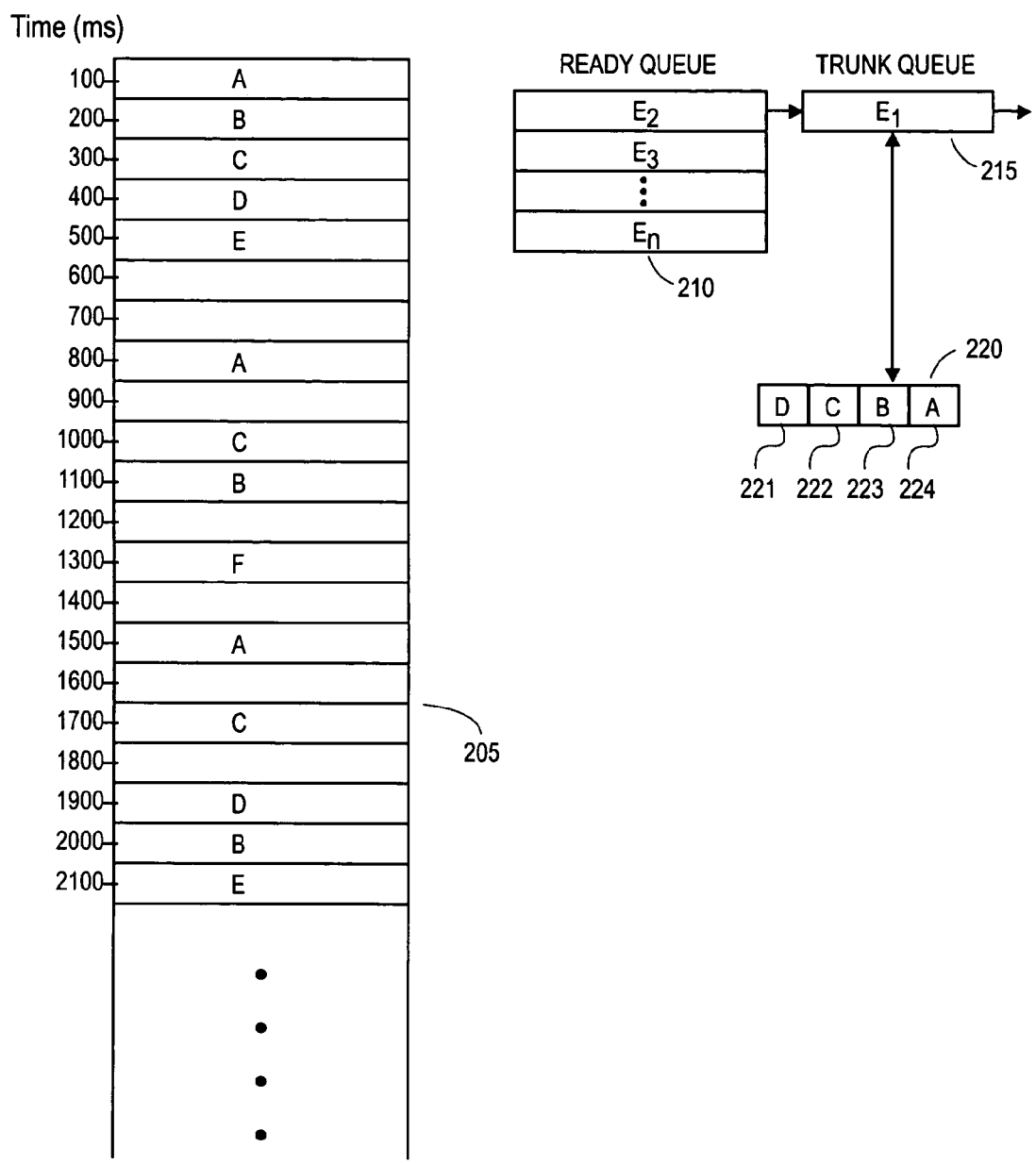
FIGS. 4A and 4B depict a simplified calendaring scheme with a parallel cache-based scheme according to one embodiment of the present invention.
Figure 4B:
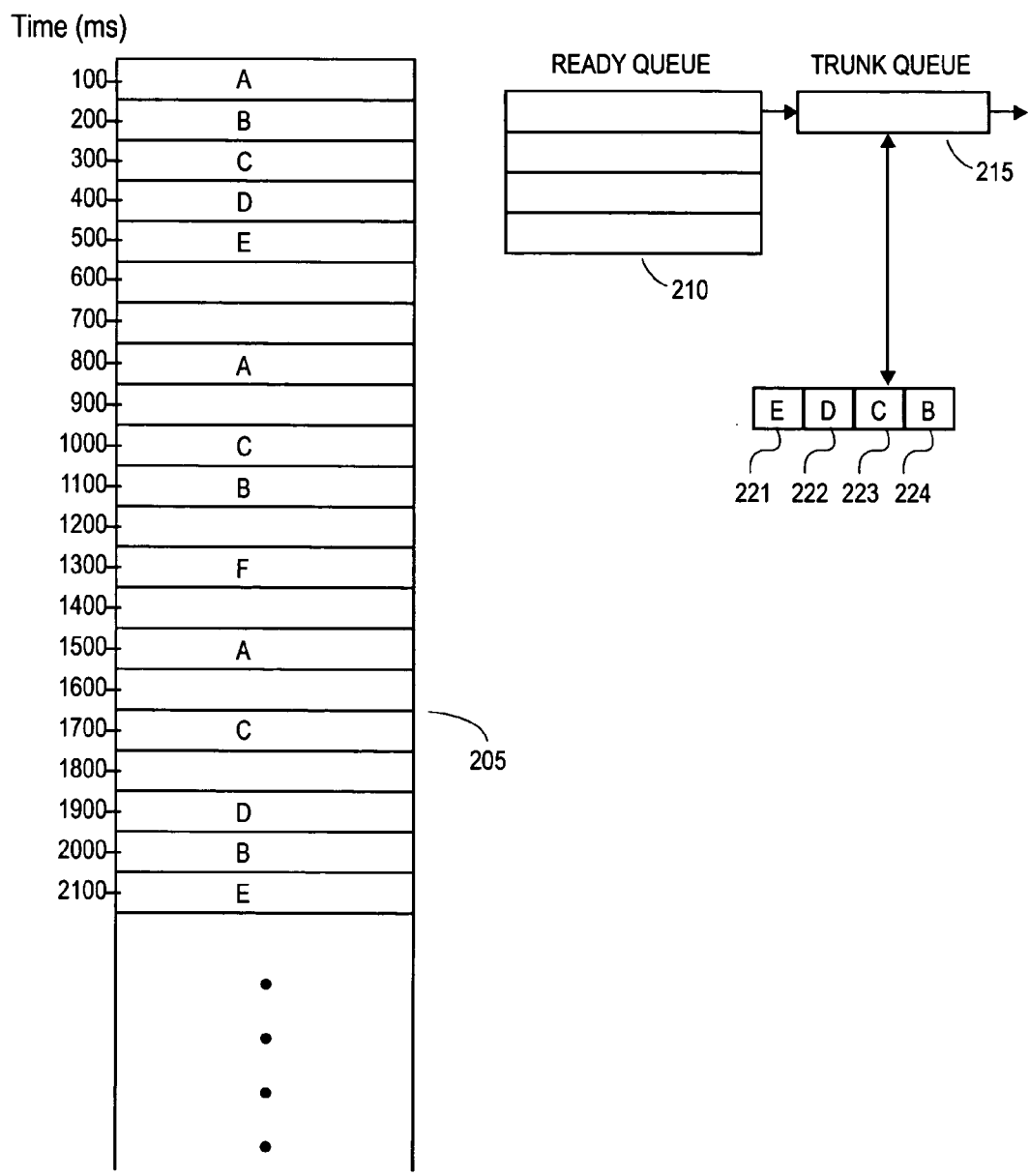

FIGS. 4A and 4B depict a simplified calendaring scheme with a parallel cache-based scheme according to one embodiment of the present invention.

FIG. 4A depicts the time in the calendaring scheme at which VCs A, B, C, and D have been processed (i.e., time equals 500 ms). The address for VC $E_1$ is in the trunk queue 215 being transmitted. The addresses for VC $E_1$–VC $E_n$ are in the ready queue 210 which can hold several addresses. The addresses for VCs A, B, C and D are stored in cache memory 220. Typically the cache may hold ten VC addresses. The address for VC D is stored in the first cache position 221 because VC D was the most recently processed VC. VCs C, B, and A are stored in the second cache positions 222, the third cache position 223, and the fourth cache position 224, respectively, based upon how recently they were processed. At time equals 500 ms VC E is processed. That is VCs scheduled to be processed at time equals 500 ms are processed (e.g., $E_1$–$E_n$). After processing, each VC is evaluated to determine if its address should be placed in the cache. The criteria used to determine this are discussed below. If the address for VC E is placed in the cache, it is placed in the first cache position 221. The address for VC D is placed in the second cache position 222. The address for VC C is placed in the third cache position 223. The address for VC B is placed in the fourth cache position 224, and the address for VC A is deleted from the cache 220. After VC $E_1$ is processed, the next VC address from ready queue 210 (i.e., for example $E_2$) is processed and then similarly evaluated and its address is placed in the first cache position 221. The other addresses in the cache are then similarly rotated with the least recently processed VC addresses being deleted from cache 220.

FIG. 4B depicts the time in the calendaring scheme at which VC E has been processed and the address for VC E has been added to the cache 220 (i.e., time equals 600 ms). At this point the ready queue 210 and the trunk queue 215 are empty. The trunk queue ASIC then reads the address stored in the first position in the cache 220 and gets the VC address stored there (i.e., the address for VC E). The trunk queue accesses the data stored at this address and transmits it over the trunk. At time equals 700 ms the trunk queue is empty again. This time the second position in the cache 220 is accessed (i.e., cache position 222) and the address for VC D is referenced and the data stored at that address is transmitted. This process continues in round-robin fashion until the trunk queue is not empty (i.e., it has received a VC address from the calendar).

Figure 5:
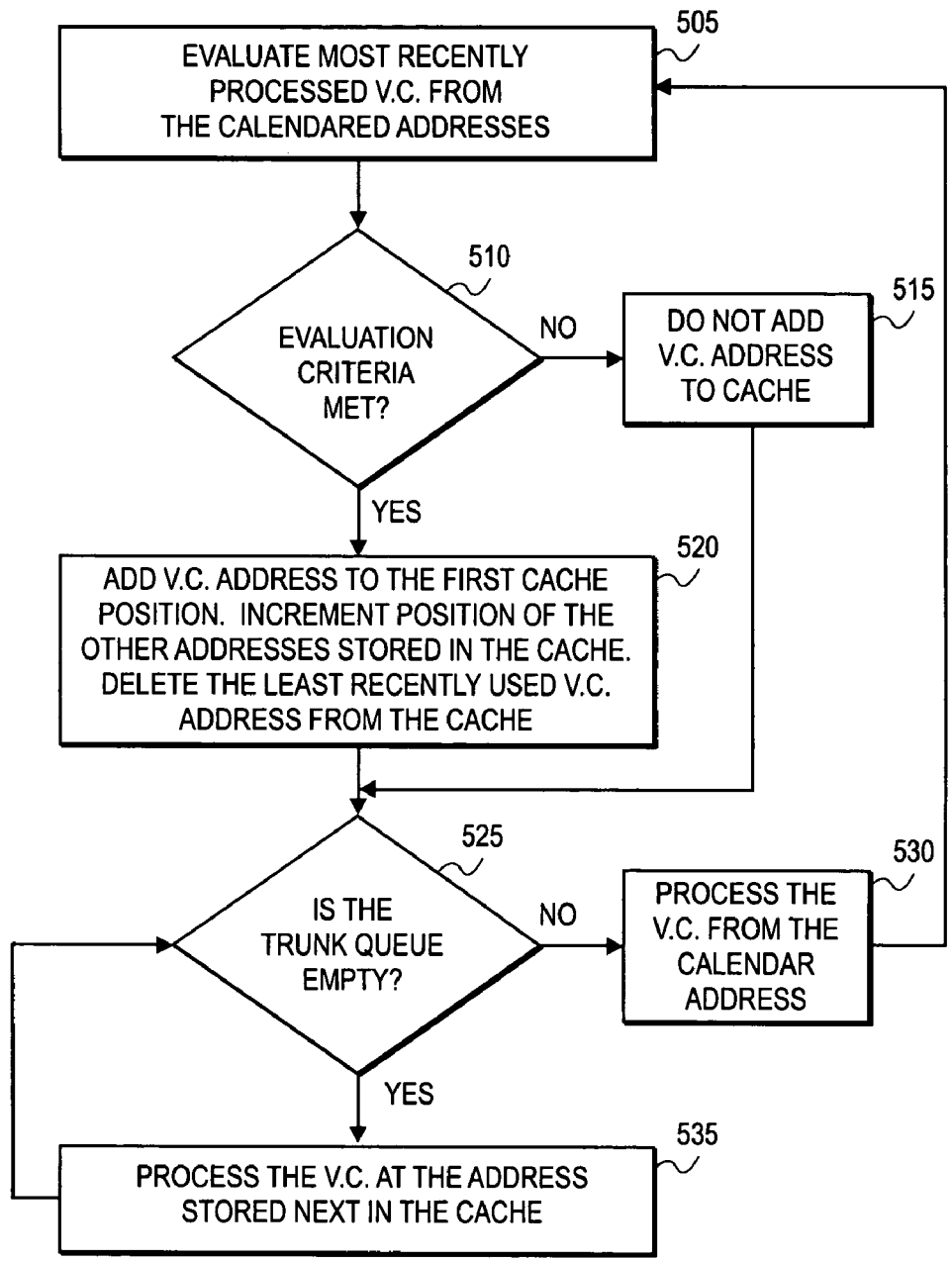
FIG. 5 is a process flow diagram of one embodiment of the present invention.

FIG. 5 is a process flow diagram of one embodiment of the present invention. Process 500, shown in FIG. 5 begins with operation 505 in which the most recently processed VC from the calendared addresses is evaluated. In one embodiment, the VC is evaluated to determine if there is additional data to transmit. Once opened a VC typically remains open for a long period of time (e.g., hours) and is processed on a continuous basis based on the criteria discussed above. At some point the VC may not have additional data to transmit. The VC will be closed and there is no point to adding this VC address to the cache. In an alternative embodiment, the recipient's ability to accept the increased data flow is evaluated. When VCs are serviced from the cache, they are exceeding their guaranteed rate. The data flow of some recipients may be metered and unable to accept data flows above a certain rate (e.g., the guarantee rate). If the recipient cannot accept the increased data flow, there is no point in adding the VC address to the cache. In an alternative embodiment the address of the most recently processed VC address may not be added to the cache if it already occupies a cache position.

At operation 515 the VC does not meet one or more of the evaluation criteria and therefore its address is not added to the cache. At operation 520 the VC meets all of the evaluation criteria and its address is placed in the first cache position. The VC addresses already in the cache are moved to the next position with the least recently used VC address being deleted from the cache.

At operation 525 the trunk queue is checked. If the trunk queue is empty then the VC corresponding to the address stored next in the cache is processed and the process continues at operation 525. If, at operation 525 the trunk queue is not empty (i.e., it contains a VC from a calendar address), then the VC corresponding to the calendar address in the trunk queue is processed and the process is continued at operation 505.

In the foregoing specification the invention has been described with reference to specific exemplary embodiments thereof. It will, however, be evident that various modifications and changes may be made thereto without departing from broader spirit and scope of the invention as set forth in the appended claims. The specification and drawings are, accordingly, to be regarded in an illustrative rather a restrictive sense.

We claim:

1. A method comprising:
   calendaring a plurality of virtual connections for processing, each virtual connection calendared to a particular time period such that the virtual connections are not calendared to at least one time period;
   storing a plurality of virtual connection addresses in a cache memory;
   processing a virtual connection corresponding to one of the plurality of virtual connection addresses during one of the at least one time periods;
   processing a calendared virtual connection; and
   adding the address of the processed calendared virtual connection to the cache memory upon a determination that the address of the processed calendared virtual connection is not currently in the cache memory, the processed calendared virtual connection has more data to transmit, and a recipient can receive more data.

2. The method of claim 1, wherein the most recently processed calendared virtual connection is stored in the cache memory.

3. The method of claim 1, wherein virtual connections corresponding to the virtual connection addresses stored in the cache memory are processed in a round-robin fashion.

4. The method of claim 1, wherein the address of a processed calendared virtual connection meeting the evaluation criteria is stored in a first cache memory position.

5. An apparatus comprising:
 means for calendaring a plurality of virtual connections for processing, each virtual connection calendared to a particular time period such that the virtual connections are not calendared to at least one time period;
 means for storing a plurality of virtual connection addresses in a cache memory;
 means for processing a virtual connection corresponding to one of the plurality of virtual connection addresses during one of the at least one time periods;
 means for processing a calendared virtual connection; and
 means for adding the address of the processed calendared virtual connection to the cache memory upon a determination that the address of the processed calendared virtual connection is not currently in the cache memory, the processed calendared virtual connection has more data to transmit, and a recipient can receive more data.

6. The apparatus of claim 5, wherein the most recently processed calendared virtual connection is stored in the cache memory.

7. The apparatus of claim 5, wherein virtual connections corresponding to the virtual connection addresses stored in the cache memory are processed in a round-robin fashion.

8. The apparatus of claim 5, wherein the address of a processed calendared virtual connection meeting the evaluation criteria is stored in a first cache memory position.

9. A machine-readable medium that provides executable instructions, which when executed by a processor, cause said processor to perform a method comprising:
 calendaring a plurality of virtual connections for processing, each virtual connection calendared to a particular time period such that the virtual connections are not calendared to at least one time period;
 storing a plurality of virtual connection addresses in a cache memory;
 processing a virtual connection corresponding to one of the plurality of virtual connection addresses during one of the at least one time periods;
 processing a calendared virtual connection; and
 adding the address of the processed calendared virtual connection to the cache memory upon a determination that the address of the processed calendared virtual connection is not currently in the cache memory, the processed calendared virtual connection has more data to transmit, and a recipient can receive more data.

10. The machine-readable medium of claim 9, wherein the most recently processed calendared virtual connection is stored in the cache memory.

11. The machine-readable medium of claim 9, wherein virtual connections corresponding to the virtual connection addresses stored in the cache memory are processed in a round-robin fashion.

12. The machine-readable medium of claim, 9 wherein the address of a processed calendared virtual connection meeting the evaluation criteria is stored in a first cache memory position.

13. An apparatus comprising:
 a virtual connection calendaring unit for calendaring a plurality of virtual connections for processing, each virtual connection calendared to a particular time period such that the virtual connections are not calendared to at least one time period;
 a virtual connection address storage unit for storing a plurality of virtual connection addresses in a cache memory;
 a virtual connection processing unit to process a virtual connection corresponding to one of the plurality of virtual connection addresses during one of the at least one time periods; and
 a calendared virtual connection processing unit to process a calendared virtual connection and add the address of the processed calendared virtual connection to the cache memory upon a determination that the address of the processed calendared virtual connection is not currently in the cache memory, the processed calendared virtual connection has more data to transmit, and a recipient can receive more data.

14. The apparatus of claim 13, wherein the most recently processed calendared virtual connection is stored in the cache memory.

15. The apparatus of claim 8, wherein virtual connections corresponding to the virtual connection addresses stored in the cache memory are processed in a round-robin fashion.

16. The apparatus of claim 13, wherein the address of a processed calendared virtual connection meeting the evaluation criteria is stored in a first cache memory position.

* * * * *